US012646440B2

(12) United States Patent
Ho et al.

(10) Patent No.: US 12,646,440 B2
(45) Date of Patent: Jun. 2, 2026

(54) DYNAMIC DISPLAY TIMING CONTROLLER FOR RADIO FREQUENCY INTERFERENCE MITIGATION

(71) Applicant: Dell Products L.P., Round Rock, TX (US)

(72) Inventors: KunDa Ho, Taipei (TW); Pin Huang Hsu, Taipei City (TW); Beomjin Kim, Georgetown, TX (US); Heejin Kim, Cedar Park, TX (US); Jusang Kim, Cedar Park, TX (US); Asim Mukarram Siddiqui, Cedar Park, TX (US); Yi-Fan Wang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/820,741

(22) Filed: Aug. 30, 2024

(65) Prior Publication Data

US 2026/0065838 A1 Mar. 5, 2026

(51) Int. Cl.
*G09G 3/20* (2006.01)

(52) U.S. Cl.
CPC ....... *G09G 3/2096* (2013.01); *G09G 2330/04* (2013.01)

(58) Field of Classification Search
None
See application file for complete search history.

(56) References Cited

U.S. PATENT DOCUMENTS

| | | | | |
|---|---|---|---|---|
| 5,765,113 A * | 6/1998 | Russo | H04B 1/38 455/574 |
| 7,389,095 B1 * | 6/2008 | Liu | H04B 15/02 455/260 |
| 7,558,348 B1 * | 7/2009 | Liu | H04B 15/02 327/551 |
| 8,412,105 B2 * | 4/2013 | Dorsey | H04B 15/02 455/72 |
| 9,270,326 B2 * | 2/2016 | Kesling | H04B 15/04 |
| 9,860,050 B1 * | 1/2018 | Noolu | H04L 5/14 |
| 10,356,401 B1 * | 7/2019 | Zhang | H04N 21/41407 |
| 11,140,381 B1 * | 10/2021 | Zhang | H04W 76/00 |
| 2009/0276639 A1 * | 11/2009 | Saha | H02M 3/156 713/300 |
| 2010/0141613 A1 * | 6/2010 | Sonobe | G09G 5/18 345/204 |

(Continued)

*Primary Examiner* — Lunyi Lao
*Assistant Examiner* — Sarvesh J Nadkarni
(74) *Attorney, Agent, or Firm* — Terrile, Cannatti & Chambers, LLP; Emmanuel A. Rivera

(57) ABSTRACT

Described herein are methods and systems for mitigating or minimizing RF Desense in an information handling system such as a laptop/notebook and tablet computer. Clock frequency a clock of a timing controller (TCON) of a display of the information handling system is dynamically changed based on the current RF band and frequency in use by the information handling system. The current RF band and frequency is determined, and the existing frequency of the TCON clock is collected. A new clock frequency is determined based on the current RF band and frequency in use RF band and frequency in use and the frequency of the TCON clock. The new clock frequency is implemented by the TCON and the display.

15 Claims, 4 Drawing Sheets

(56) References Cited

U.S. PATENT DOCUMENTS

| | | | | |
|---|---|---|---|---|
| 2015/0012682 | A1* | 1/2015 | Yang | G09G 5/006 710/316 |
| 2016/0203802 | A1* | 7/2016 | Hong | G09G 5/003 345/534 |
| 2017/0110078 | A1* | 4/2017 | Kim | G09G 3/2096 |
| 2020/0314799 | A1* | 10/2020 | Henry | H04W 4/80 |
| 2025/0104599 | A1* | 3/2025 | Poddar | G09G 3/2096 |

* cited by examiner

DYNAMIC DISPLAY TIMING CONTROLLER FOR RADIO FREQUENCY INTERFERENCE MITIGATION

BACKGROUND OF THE INVENTION

Field of the Invention

The present invention relates to information handling systems. More specifically, embodiments of the invention provide for dynamically mitigating radio frequency (RF) Desense in an information handling system, such as a laptop/notebook and tablet computer.

DESCRIPTION OF THE RELATED ART

As the value and use of information continues to increase, individuals and businesses seek additional ways to process and store information. One option available to users is information handling systems. Information handling systems include personal computers (PC), server computers, such as desktops. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include laptop/notebook and tablet computer systems. Such laptop/notebook and tablet computer systems make use of a display screen or display. Displays implement a timing controller or TCON, which is an active component that performs as an intermediary between an information handling system (i.e., mainboard) and the display (TCON). The c information handling system (i.e., mainboard) processes signals and sends corresponding video data to the display (i.e., TCON). This communication can be through an embedded display port (i.e., eDP) interface. The TCON interprets the signals/data which is converted to signals/data that is understood by the display. The display is able to synchronized and coordinate activation of pixels, correct colors, and images in the right sequence.

Laptop/notebook and tablet information handling systems have platforms that support multiple radio frequency (RF) bands which provide wireless communications, include 5G RF bands and ultra-low band such as B71. Communication between the information handling system (i.e., mainboard) introduces RF harmonics. Such RF harmonics can introduce RF Desense, wherein sensitivity to incoming signals of a wireless receiver is reduced. The RF harmonics of the TCON overrides or affects the incoming RF signals to the laptop/notebook and tablet information handling system, and affects wireless communications.

RF Desense can be addressed by providing a RF absorber over the panel board of the display; however, such a solution can be expensive and not applicable for certain platforms due to mechanical limitations of the panel board and/or cover (i.e., A cover) of the display. Furthermore, display platforms from different vendors/sources may differ as to RF performance.

SUMMARY OF THE INVENTION

A computer-implementable method, system and non-transitory, computer-readable storage medium for adjusting clock frequency of a timing controller (TCON) of information handling system to mitigate RF Desense comprising determining RF band and frequency in use by the information handling system; collecting frequency of a clock of the TCON; calculating a new clock frequency that mitigates or minimizes RF Desense based on the determined RF band and frequency in use and the collected frequency of the clock of the TCON; storing the calculated new clock frequency; reading the stored calculated new clock frequency; and implementing the read new clock frequency by the TCON and display of the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Implementations herein provide for dynamically controlling a timing controller (TCON) point to point (P2P) clock frequency based on an active RF band that is used by an information handling system (e.g., laptop/notebook or tablet). The change or adjustment of the TCON P2P clock frequency mitigates RF Desense for the active RF band. Other RF bands can be in use of the computer system; however, frequency change or adjustment for one RF band may mitigate RF Desense for that RF band, but RF Desense can still exist for other RF bands. Therefore, a dynamic determination and adjustment of the TCON P2P clock frequency is performed as to the active RF band in use.

Implementations further provide TCON P2P clock to be controlled at the display, such as by firmware, as to being directly controlled by the information handling system (e.g., information handling system CPU/processors). Communication is maintained between the display and the information handling system to determine RF bands in use, where RF bands can be used for wireless communication such as Wi-Fi and cellular.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
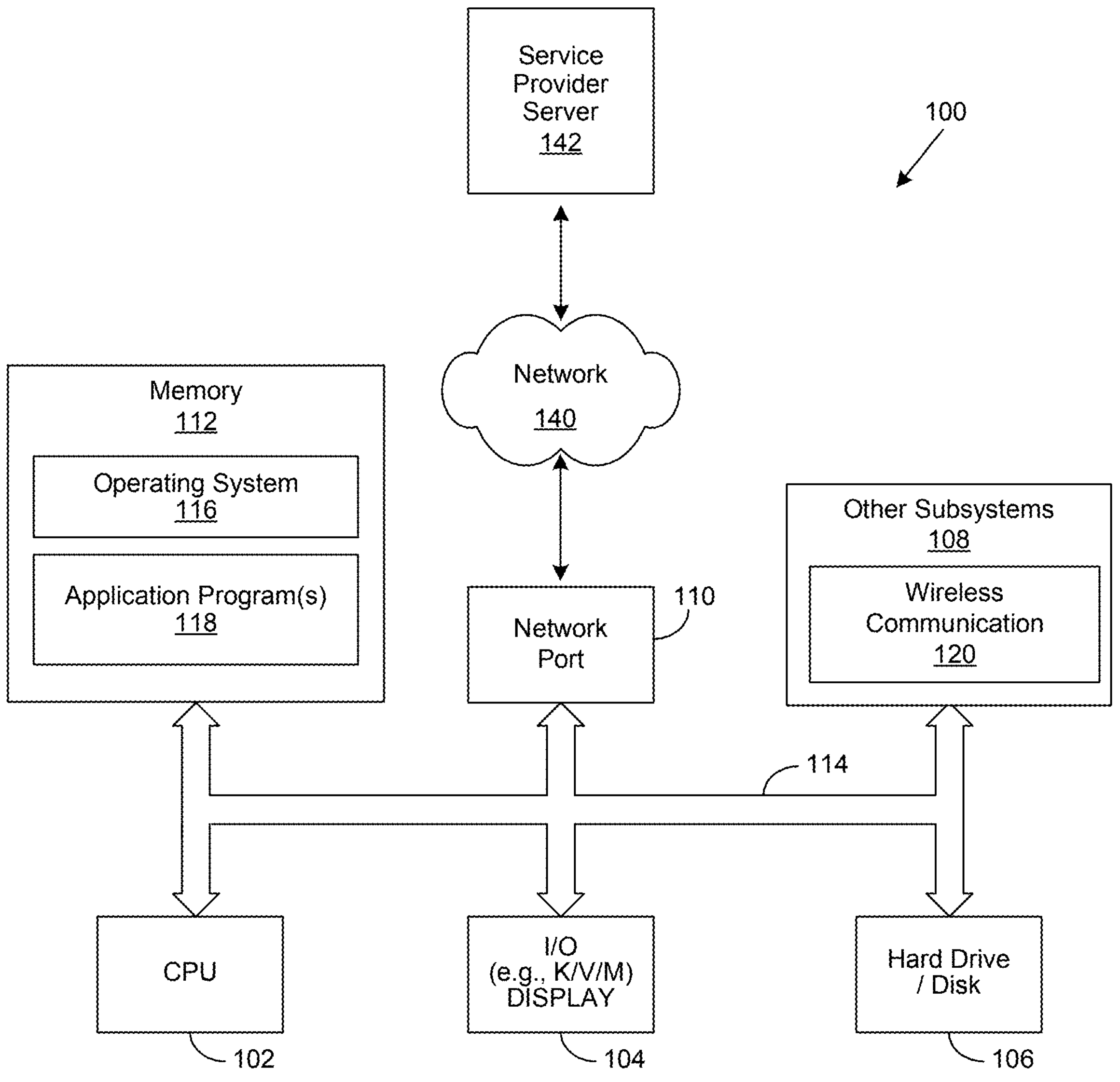
FIG. 1 is a general illustration of components of an information handling system as implemented in the present invention.

FIG. 1 is a generalized illustration of an information handling system 100 that can be used to implement the system and method of the present invention. The information handing system 100 can be a host to the peripheral devices described herein. The information handling system 100 can include desktop computer, server computer, a laptop or notebook personal computer (PC), a tablet computer, PC integrated into a keyboard, etc. In particular, implementations described herein provide for a laptop or notebook PC system or tablet computer.

The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In particular, I/O devices 104 include a display as further described herein. As further described herein the display, embodiments of the display provide for specific components as implemented in the present invention.

In various embodiments, the information handling system 100 also includes network port 110 operable to connect to a network 140, where network 140 can include one or more wired and wireless networks, including the Internet. Network 140 is likewise accessible by a service provider server 142. The information handling system 100 likewise includes system memory 112, which is interconnected to the foregoing via one or more busses 114.

System memory 112 can be implemented as hardware, firmware, software, or a combination of such. System memory 112 further includes an operating system (OS) 116. Embodiments further provide for the system memory 112 to include software applications 118. In various implementations, other subsystems 120 can include wireless communication 120 that supports wireless communication for the information handling system 100.

Figure 2:
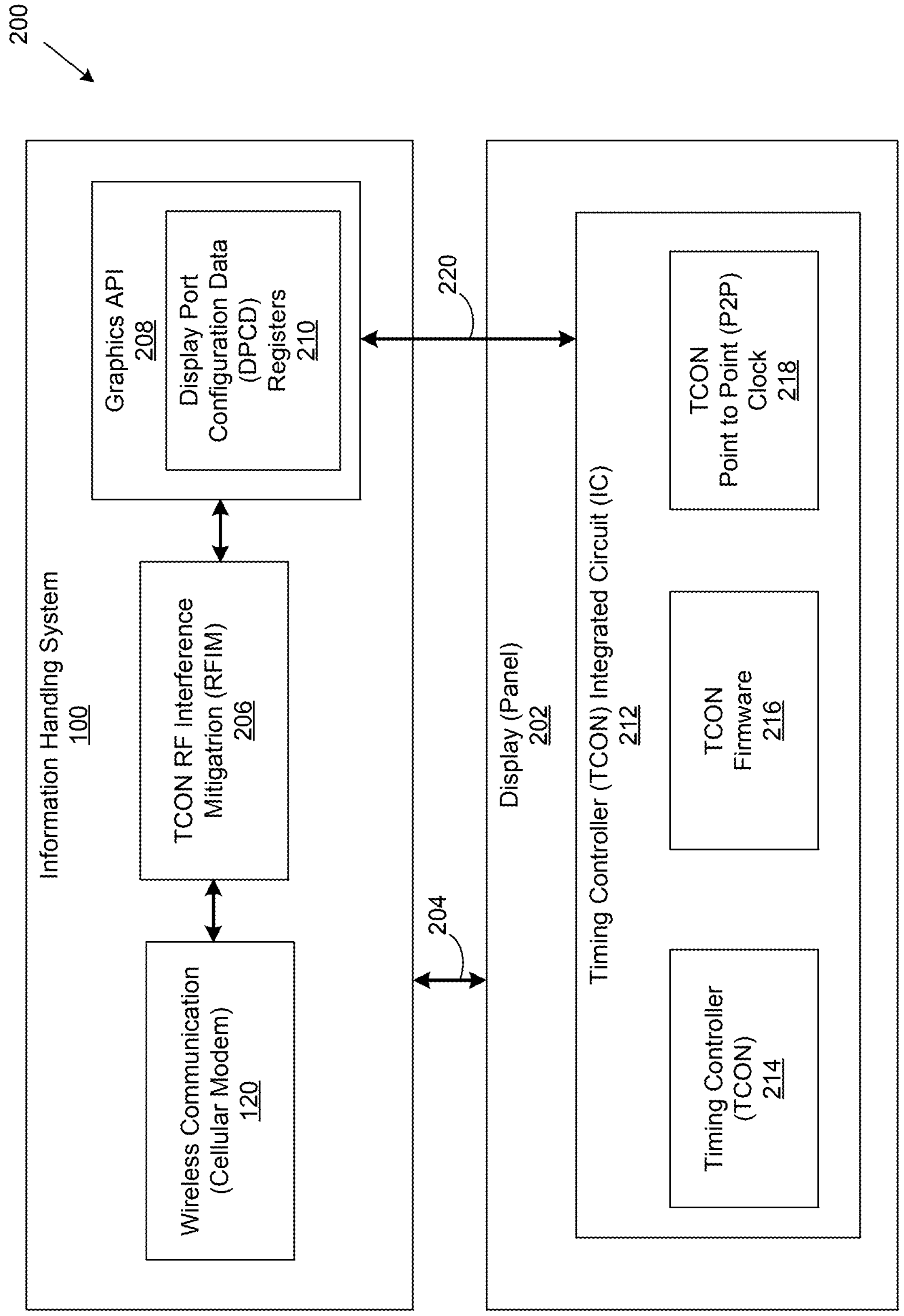
FIG. 2 is a system configuration of an information handling system and display as implemented in the present invention.

FIG. 2 is an example system configuration of an information handling system and display. The system 200 includes an information handling system 100 as described in FIG. 1. As discussed above, the information handling system 100 can be implemented as a laptop or notebook PC system or tablet computer.

The information handling system 100 can include/connect to a display or panel 202, such as I/O devices 104 described in FIG. 1. The information handling system 100 can be connected to display 202 a bus or connection 204, which can be included in busses 114 described in FIG. 1.

Implementations provide for the information handling system 100 to include wireless communication component 120 as described in FIG. 1. The wireless communication 120 supporting wireless communication between the information handling system 100 and other devices and systems. The wireless communication 120 can include components, such as a cellular modem and WiFi components that receive and transmit RF signals. Such RF signals are transmitted over different RF bands, such as 5G RF bands, LTE bands such B5, and ultra-low bands such as B71. It is desirable to mitigate/minimize RF Desense, such that such RF signals are able to be received and transmitted.

Implementations provide for the information handling system 100 to include a TCON RF interference mitigation component (RFIM) 206 and graphics application programming interface (API) 208. The graphics API 208 can be considered a graphics library, which is a program library designed to aid in rendering computer graphics to a monitor or display, such as display 202. Optimal versions of functions can be provided that handle common rendering tasks and are performed in software running on a CPU (e.g., CPU 102), hardware accelerated in a graphical processing unit (GPU). The graphics API 208 can include display port configuration data (DPCD) registers 210. The TCON RFIM 206, graphics API 208, and DPCD registers 210 are further described below.

The display 202 can be implemented with a TCON integrated circuit (IC) 212. The TCON IC 212 can be implemented as a computing device with processors, memory, and communication busses (not shown). Implementations provide for the TCON IC 212 to include a timing controller (TCON) 214, TCON firmware 216, and TCON point to point (P2P) clock 218. The TCON IC 212, TCON 214, TCON firmware 216, and TCON P2P clock 218 are further described below. Implementations provide for the graphics API 208 to directly communicate to the TCON IC 212 through communication 220 which can be an eDP auxiliary channel.

Figure 3:
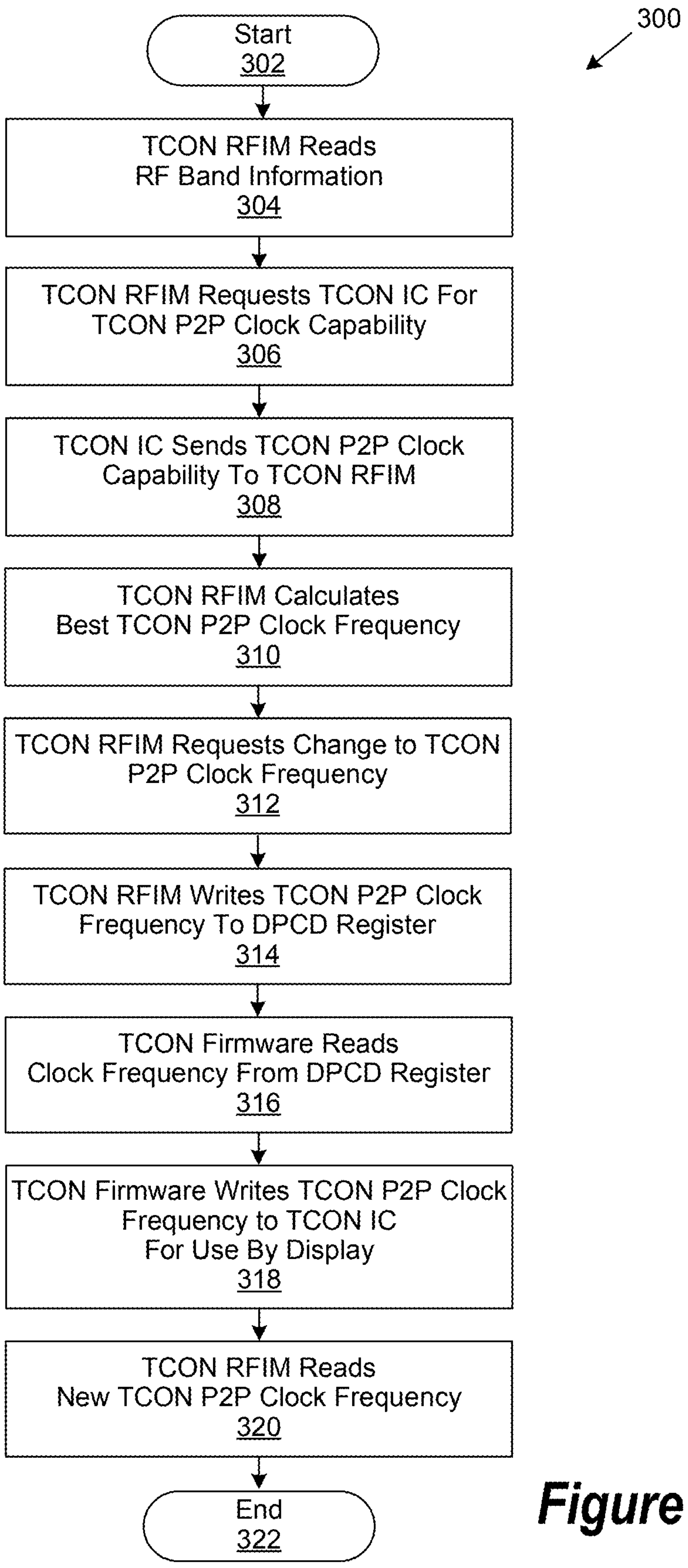
FIG. 3 is a generalized flowchart for mitigating RF Desense in an information handling system as implemented in the present invention.

FIG. 3 is a generalized flowchart for mitigating RF Desense in an information handling system as implemented in the present invention. The workflow or process 300 can implement the components as described herein. Furthermore, the steps can be implemented in memory, including firmware as described in FIG. 1. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 302, the process 300 starts. At step 304, the TCON RFIM 206 reads RF band information from the wireless communication component 120 (e.g., cellular modem). The information that is read can include for example a current LTE band and channel that is in use by the information handling system 100.

At step 306, the TCON RFIM 206 requests from the TCON IC 212 for capability of the TCON P2P clock 218 in order to collect information for a computational algorithm used to adjust frequency of the TCON P2P clock 218 in order to mitigate RF Desense. The requested and collected information can include the following. Whether TCON P2P clock 218 can dynamically change (Yes/No). TCON P2P clock 218 minimum and maximum frequency, with a range of solution (i.e., frequency). TCON P2P clock 218 spread spectrum (i.e., spread spectrum clock/SSC) value. Number of bits for a clocking training pattern.

At step 308, the TCON IC 212 the requested information and collected information to the TCON RFIM 206. At step 310, the TCON RFIM 206 calculates the best frequency for the TCON P2P clock 218 to mitigate/minimize RF interference/RF Desense. The best frequency is based on the RF/radio band information received from the wireless communication component 120, and the information from the TCON IC 212.

At step 312, the TCON RFIM 206 requests the TCON IC 212 for a change of clock frequency of the TCON P2P clock 218, which is the calculated best frequency. The request can be made through an auxiliary eDP channel. At step 314, the TCON RFIM 206 writes to a DPCD register 210 the new register value/clock frequency. The DPCD registers 210 are defined for reading and rewriting to the TCON P2P clock 218 via the TCON IC 212.

At step 316, TCON firmware 216 reads the clock frequency from the DPCD register 210. At step 318, the TCON firmware 216 writes to new clock frequency to the TCON IC 212. The new clock frequency is implemented on the TCON P2P clock 218 and used by the display 202. At step 320, the TCON RFIM 206 reads then clock frequency of the TCON P2P clock 218. At step 322, the process 300 ends.

Figure 4:
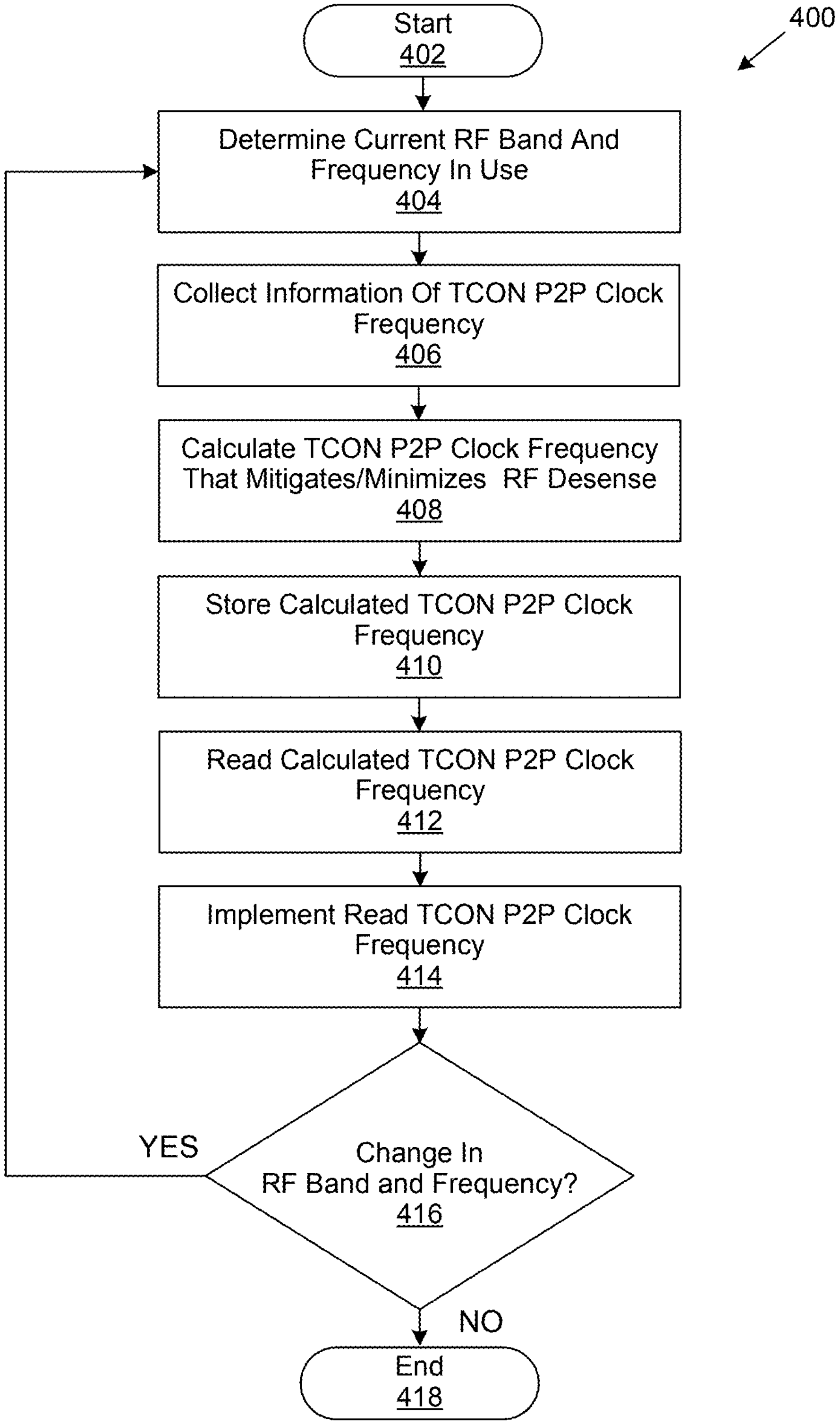
FIG. 4 is a generalized flowchart for dynamically adjusting clock frequency of a timing controller of information handling system to mitigate RF Desense.

FIG. 4 is a generalized flowchart for adjusting clock frequency of a timing controller of information handling system to mitigate RF Desense. The workflow or process 400 can implement the components as described herein. Furthermore, the steps can be implemented in memory, including firmware as described in FIG. 1. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 402, the process 400 starts. At step 404, a determination is performed as to the current RF band and frequency in use by the information handling system. As discussed, the determination can be performed by the TCON RFIM 206 querying the wireless communication 120.

At step 406, information is collected as to the frequency of TCON P2P clock 218. As discussed, collection can be performed by the TCON RFIM 206 requesting information from the TCON IC 212.

At step 408, a calculation is performed as to clock frequency that can be used by that TCON P2P clock 218 to mitigate/minimize RF Desense. Implementations provide for the TCON RFIM 206 to perform the calculation.

At step 410, the calculated clock frequency is stored. As discussed, the calculated clock frequency can be stored to a designated a DPCD register 210.

At step 412, the calculated and stored clock frequency read. As discussed, the clock frequency is read by the TCON IC 212 from the designated DPCD register 210.

At step 414, the read clock frequency is implemented by the TCON IC for use by the display 202. A step 416, a determination is performed whether the change in the RF band and frequency is in use by the information handling system. If there is a change, following the YES branch of step 416, the process 400 goes back to step 404. Otherwise, if there is not a change, following the NO branch of step 416, at step 418, the process 400 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for adjusting clock frequency of a timing controller (TCON) of information handling system to mitigate RF Desense comprising:

determining point-to-point (P2P) clock frequency based on an active RF band in use by the information handling system;

collecting frequency of a clock of the TCON, wherein the collecting is frequency of the clock of the TCON performed by an RF TCON RF interference mitigation component, which further collects capability of the clock of the TCON, wherein the capability that is collected is used for a computational algorithm adjusting frequency clock of the TCON that includes the following: clock dynamic range, clock minimum and maximum frequency, clock spread spectrum, and number of bits for clocking training;

calculating a new clock frequency that mitigates or minimizes RF Desense based on a determined RF band and frequency in use and the collected frequency of the clock of the TCON;

storing the calculated new clock frequency;

reading the stored calculated new clock frequency; and dynamically implementing a new P2P clock frequency based on the read new clock frequency of the active RF band in order to mitigate RF Desense for the active RF band, by the TCON and display of the information handling system.

2. The computer-implementable method of claim 1, wherein the determining RF band and frequency is performed by an RF TCON RF interference mitigation component by querying a wireless communication component.

3. The computer-implementable method of claim 1, wherein the storing and reading from is performed on a designated display port configuration data (DPCD) register.

4. The computer-implementable method of claim 1 further comprising reading the implemented new clock frequency.

5. The computer-implementable method of claim 1 further comprising determining if a change in RF band and frequency in use by the information handling system.

6. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations for adjusting clock frequency of a timing controller (TCON) of information handling system to mitigate RF Desense and comprising instructions executable by the processor and configured for: initiating a user program comprising;

determining point-to-point (P2P) clock frequency based on an active RF band in use by the information handling system;

collecting frequency of a clock of the TCON, wherein the collecting is frequency of the clock of the TCON performed by an RF TCON RF interference mitigation component, which further collects capability of the clock of the TCON, wherein the capability that is collected is used for a computational algorithm adjusting frequency clock of the TCON that includes: clock dynamic range, clock minimum and maximum frequency, clock spread spectrum, and number of bits for clocking training;

calculating a new clock frequency that mitigates or minimizes RF Desense based on a determined RF band and frequency in use and the collected frequency of the clock of the TCON;

storing the calculated new clock frequency;

reading the stored calculated new clock frequency; and dynamically implementing a new P2P clock frequency based on the read new clock frequency of the active RF band in order to mitigate RF Desense for the active RF band, by the TCON and display of the information handling system.

7. The system of claim 6, wherein the determining RF band and frequency is performed by an RF TCON RF interference mitigation component by querying a wireless communication component.

8. The system of claim 6, wherein the storing and reading from is performed on a designated display port configuration data (DPCD) register.

9. The system of claim 6, further comprising reading the implemented new clock frequency.

10. The system of claim 6, further comprising determining if a change in RF band and frequency in use by the information handling system.

11. A non-transitory, computer-readable storage medium embodying computer program code for adjusting clock frequency of a timing controller (TCON) of information handling system to mitigate RF Desense, the computer program code comprising computer executable instructions configured for:

determining point-to-point (P2P) clock frequency based on an active RF band in use by the information handling system;

collecting frequency of a clock of the TCON, wherein the collecting is frequency of the clock of the TCON performed by an RF TCON RF interference mitigation component, which further collects capability of the clock of the TCON, wherein the capability that is collected is used for a computational algorithm adjusting frequency clock of the TCON that includes: clock dynamic range, clock minimum and maximum frequency, clock spread spectrum, and number of bits for clocking training;

calculating a new clock frequency that mitigates or minimizes RF Desense based on a determined RF band and frequency in use and the collected frequency of the clock of the TCON;

storing the calculated new clock frequency;

reading the stored calculated new clock frequency; and dynamically implementing a new P2P clock frequency based on the read new clock frequency of the active RF band in order to mitigate RF Desense for the active RF band, by the TCON and display of the information handling system.

12. The non-transitory, computer-readable storage medium of claim 11, wherein the determining RF band and frequency is performed by an RF TCON RF interference mitigation component by querying a wireless communication component.

13. The non-transitory, computer-readable storage medium of claim 11, wherein the storing and reading from is performed on a designated display port configuration data (DPCD) register.

14. The non-transitory, computer-readable storage medium of claim 11 further comprising reading the implemented new clock frequency.

15. The non-transitory, computer-readable storage medium of claim 11 further comprising determining if a change in RF band and frequency in use by the information handling system.

* * * * *